United States Patent Office 3,160,148
Patented Dec. 8, 1964

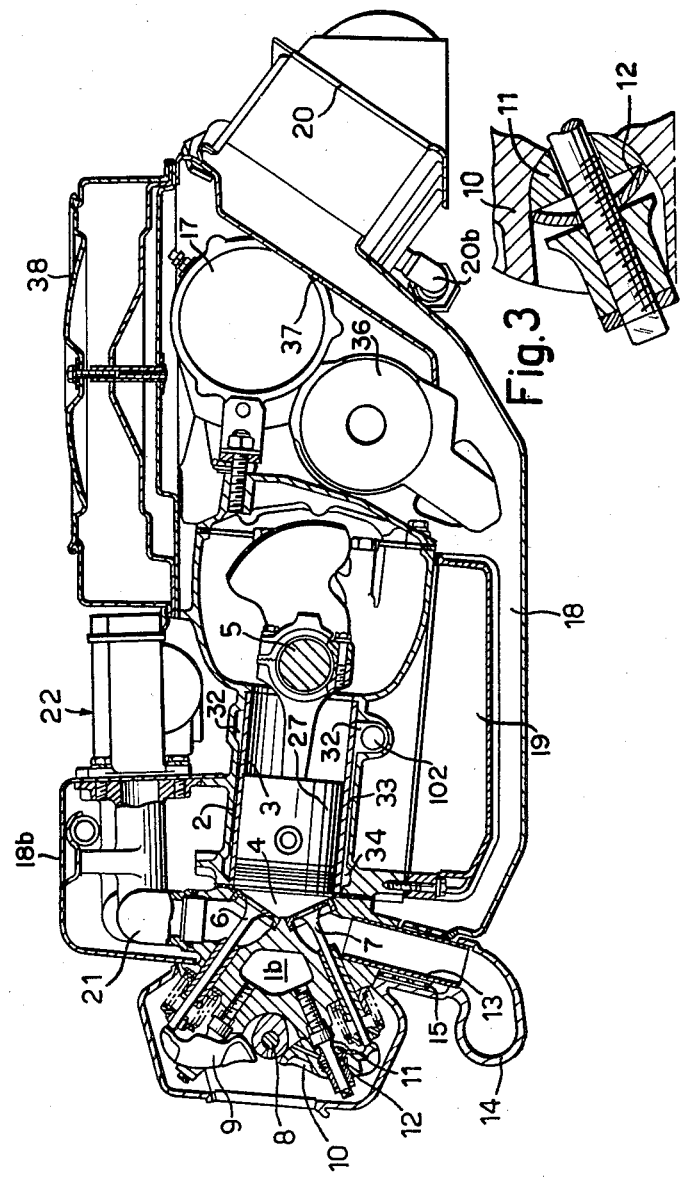

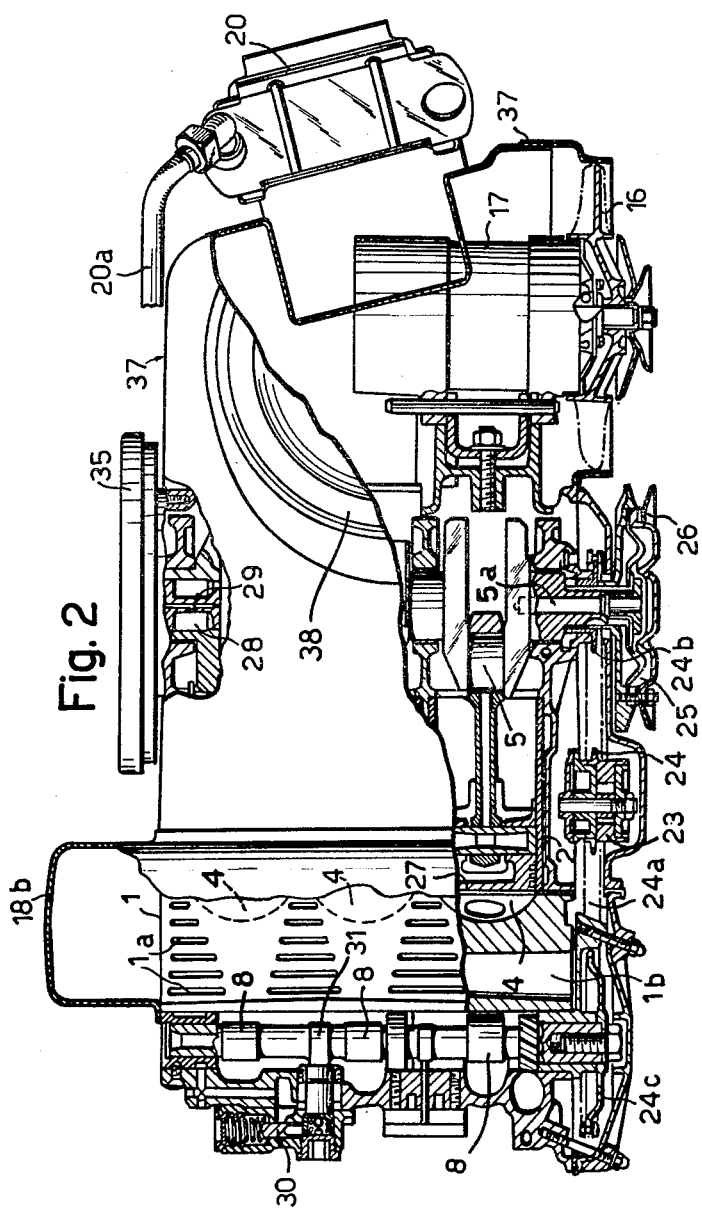

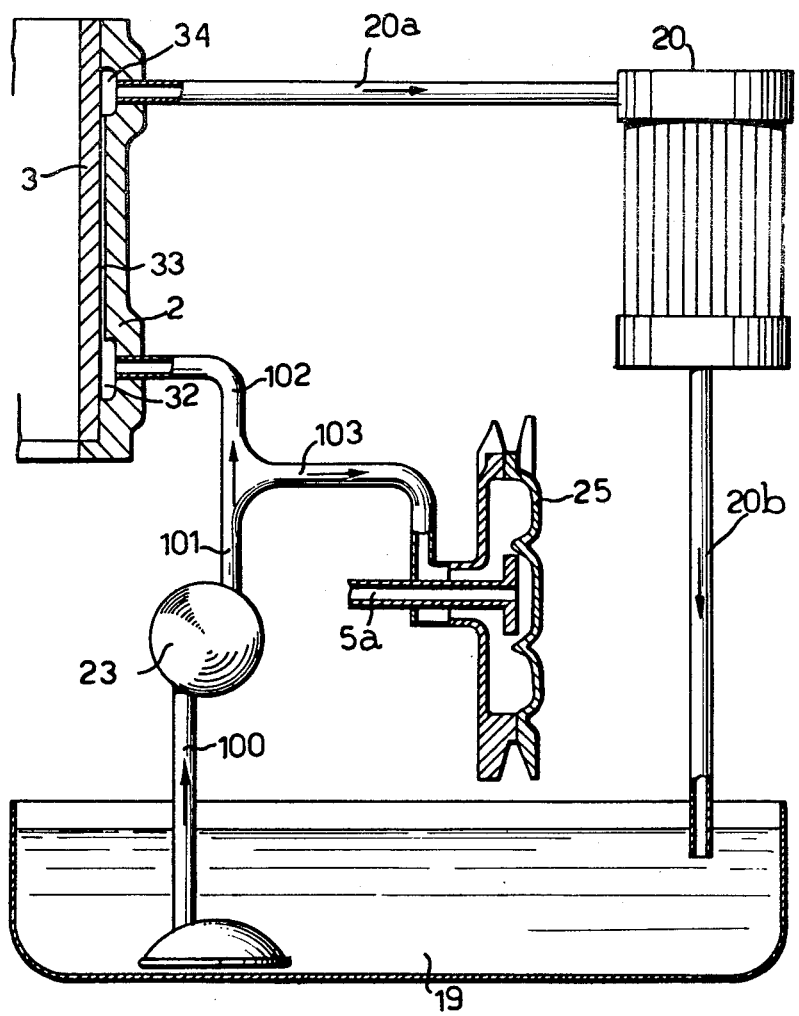

3,160,148
INTERNAL COMBUSTION ENGINE
Dante Giacosa and Giovanni Torazza, Turin, Italy, assignors to Fiat Societa per Azioni, Turin, Italy
Filed Feb. 5, 1963, Ser. No. 256,355
Claims priority, application Italy Feb. 10, 1962
3 Claims. (Cl. 123—41.57)

This invention relates to an internal combustion engine having cylinders disposed laterally of the engine shaft in a substantially horizontal plane, more particularly for motor vehicles.

The object of the invention is to provide a compact engine of the above mentioned type having limited size in longitudinal and vertical directions.

The improved engine distinguishes by the following combination of features:

(a) Engine head cooled by an air stream derived from the fan, said stream flowing in sequence along the oil sump, exhaust side, and intake side of the head;

(b) Semispherical combustion chambers having valves and conduits situated in planes transversely of the engine axis.

(c) Spark plugs extending along axes slightly spaced from the combustion chamber axes.

(d) Valve gear cam shaft arranged overhead, the cams on which effect control both of intake and exhaust valves, through similar rocker arms symmetrically mounted about spherical fulcra;

(e) Ignition distributor, gasoline pump and oil pump for servocontrols secured to the head, operated by the cam shaft.

(f) Cooling of cylinder bores by pressure oil circulating at high speed through restricted passages between the separately attached liners and engine casing.

(g) Oil pump of sufficient displacement to effect lubrication and cooling of the liners, incorporated by a tensioning roller for an endless chain driving the engine cam shaft.

Further characteristic features of this invention will be understood from the appended detailed description referring to the accompanying drawings, wherein:

FIGURE 1 is a vertical cross sectional view of the engine, and

FIGURE 2 is a part plan and sectional view thereof.

FIGURE 3 is an enlarged detail of FIGURE 1.

FIGURE 4 is a diagrammatic representation of the oil distributing circuit.

The engine head 1 (FIG. 2) is air-cooled and is provided with slots 1a and cavities 1b affording adequate passage of cooling air inspire of the reduced spacing of the adjacent cylinders. The head is moreover of a convenient shape for stripping as a whole from metal cores in a chill mold or pressure casting process.

The engine block 2 is made of steel or aluminum, the cylinder liners 3 being demountably fitted in cylinder bores thereof.

The combustion chambers 4 in the head 1 are of semispherical shape, and the cylinder valves and conduits are situated in planes extending transversely of the axis of the engine shaft 5, the valve stems being inclined to each other and forming a V.

The intake conduits and valves 6 are arranged at the top side, the exhaust conduits and valves 7 being arranged at the bottom side of the head 1 mounted on the engine block 2.

The valves 7 and 6 are controlled by a cam shaft 8 arranged on the engine head between the stems of the valves and provided with a single cam for controlling both valves 6, 7 on each cylinder. The cam controls the valves by means of two rocker arms 9, 10 symmetrically arranged at a suitable angle.

The rocker arms 9, 10 are mounted on semispherical fulcra 11 (FIG. 3) through the interposition of spring washers 12 which, under limited load, make up for play in adjustment and maintain the rocker arm shoes in contact with the base circles of cams, when the latter are turned towards the shoes, whereby knocking between said shoes and cams is avoided.

Exhaust from each cylinder is effected through exhaust tube 13 secured to the head and connected to an exhaust manifold 14. A tube 15 is arranged around each tube 13 so as to leave an air gap opened at 15a to the atmosphere. The walls of tube 15 are perforated by holes 15b to allow a partial discharge of the cooling air to the outside, whereby to cool the tubes 13.

The cooling air is supplied by fan 16, which is mounted on shaft of the current generator 17. The fan delivers the air through a duct 18 arranged beneath the oil sump 19 towards the engine head, and through duct 18a towards an oil cooler 20.

The air flowing through the duct 18 cools the exhaust tubes 13, and is conveyed by means of a shroud 18b arranged around the head 1 past and through the openings 1a, 1b of the head 1, and through the perforations 15b of the tubes 15, whereby the head and the exhaust tubes 13 are cooled and the intake conduit 21 is heated, the conduit 21 being connected with a carburetor 22 of a horizontal type.

The oil cooler 20 is provided with a vane type valve, not shown on the drawing, opening of which is effected by a thermostat responsive to the temperature of the oil in the sump and of the air issuing from the cooler.

The oil cooler 20 is conveniently arranged above the sump 19 and comprises an oil inlet pipe 20a and an outlet pipe 20b. With the engine switched-off, the oil flows through the conduit 20b and empties the cooler.

The vehicle is heated by air obtained from that flowing past the cooler, directly from the outside, so that it does not contact either the exhaust conduits or head and is therefore free from contaminants due to exhaust gases, gasoline vapors or dust burnt in contact with very hot walls of the vehicle heating ducts.

An oil pump 23 is incorporated in the tensioning roller 24 of an endless chain 24a meshing with chain sprockets 24b, 24c keyed on the engine shaft 5 and cam shaft 8 to drive the latter. The pump 23 draws oil from sump 19 through a conduit 100, and is of a sufficient displacement to supply through a conduit 101 lubricating oil and oil for cooling the cylinder liners. The lubricating oil flows through conduit 103, branching off conduit 101, to a centrifugal filter 25 incorporated by a pulley 26 driving the generator 17 and fan 16, flows through conduit 5a in the engine crankshaft 5 and lubricates in a known manner the crank shaft and connecting rod bearing, piston pins and pistons 27.

A chamber 28 communicating with the conduit 5a is provided in the rear end of the engine shaft 5 and supplies oil through a calibrated bore 29 to an oil operated centrifugal friction clutch 35.

Oil supply to an auxiliary high pressure pump 30 for servocontrols is derived from the lubricating oil circuit. The pump 30 is operated by a cam 31 on the valve gear shaft.

Oil for cooling the cylinder liners flows through a conduit 102 connected to conduit 101, and enters a chamber 32 beneath the cylinders and flows through clearances provided between and walls of the cylinder bores, said clearance being formed by the cylinder bore wall and a portion of the external wall of the cylinder liner 33, which portion is formed by a recess extending between the end portions of the cylinder liner and having a lesser diameter than these end portions the cylinder liners and reaches a conduit 34 provided in the engine block, close to the head. Oil from the conduit 34 passes through the conduit 20a to the cooler 20 from which the oil is discharged to the sump 19 through the conduit 20b.

A release valve (not shown) is also arranged between the conduit 34 and the cooler and short-circuits the cooler when the oil pressure exceeds the maximum admissible limit.

The current generator 17 and a starter 36 are arranged within a closure 37, sealingly closing the engine block 2 and shaft 5 on opposite side to the engine head 1. An air intake filter 38 is fixed externally on closure 37.

What we claim is:

1. Internal combustion engine with cylinders disposed laterally of the engine shaft in a substantially horizontal plane, more particularly for motor vehicles, comprising;
   (a) a force draft air cooled cylinder head having walls provided with slots and cavities for air passage and an externally arranged air conveying shroud;
   (b) semispherical combustion chambers in said head having intake and exhaust valves, valve stems and related conduits situated in planes transversely of the engine shaft;
   (c) a cam shaft arranged on the head, between the valve stems and having a single cam for controlling intake and exhaust valves of each cylinder;
   (d) two similar rocker arms for each cylinder mounted on semi-spherical fucra supported by the engine head for controlling said intake and exhaust valves of each cylinder;
   (e) an endless chain transmission between the engine shaft and the cam shaft;
   (f) pressure oil cooled cylinder liners in each cylinder said cylinder liners comprising an external recess extending intermediately the end portion of the liner and having a lesser diameter than said end portions;
   (g) an oil pump incorporated by a tensioning roller of the chain transmission.

2. Internal combustion engine as claimed in claim 1, wherein the exhaust conduit for each cylinder comprises a tube section incorporated in the cylinder head and connecting the exhaust valve with an exhaust manifold, and a perforated tube having an internal diameter larger than the external diameter of said tube section arranged around said tube section within the air conveying shroud of the head and having its end opened to the atmosphere to provide a direct discharge to the outside of cooling passing from the air conveying shroud through said perforations and flowing along the tube sections.

3. Internal combustion engine as claimed in the claim 1, further comprising a spring washer arranged between each semi-spherical fulcrum and corresponding rocker arm to make up for any play between shoes of the rocker arms and base circles of cams of the cam shaft.

References Cited by the Examiner
UNITED STATES PATENTS 2,063,825 12/36 Otwell _____ 123—41.57
2,845,053 7/58 Humphreys _____ 123—90

KARL J. ALBRECHT, *Acting Primary Examiner.*
FRED E. ENGELTHALER, RICHARD B. WILKINSON, *Examiners.*